Aug. 21, 1956 B. D. KUMPFER 2,760,111

MAGNETRON AMPLIFIER

Filed June 28, 1950 6 Sheets-Sheet 1

*INVENTOR.*
BEVERLY D. KUMPFER

BY Harry M. Saragovitz
Attorney

INVENTOR.
BEVERLY D. KUMPFER
BY
Harry M. Saragovitz
Attorney

INVENTOR.
BEVERLY D. KUMPFER
BY
Harry M. Saragovitz
Attorney

Aug. 21, 1956 B. D. KUMPFER 2,760,111

MAGNETRON AMPLIFIER

Filed June 28, 1950 6 Sheets-Sheet 4

INVENTOR.
BEVERLY D. KUMPFER

BY
Harry M. Saragovitz
ATTORNEY

INVENTOR.
BEVERLY D. KUMPFER
BY Harry M. Saragovitz
ATTORNEY

INVENTOR.
BEVERLY D. KUMPFER
BY
Harry M. Saragovitz
Attorney 2,760,111

MAGNETRON AMPLIFIER

Beverly D. Kumpfer, Spring Lake Heights, N. J., assignor to the United States of America as represented by the Secretary of the Army Application June 28, 1950, Serial No. 170,875

6 Claims. (Cl. 315—39.3)

(Granted under Title 35, U. S. Code (1952), sec. 266)

The invention described herein may be manufactured and used by or for the Government for governmental purposes, without the payment of any royalty thereon.

This invention relates to high frequency electric discharge devices and more particularly to magnetrons adapted for use as microwave amplifiers.

It is well known that amplification of microwave radio signals may be achieved by the energy exchange between an electron stream and the electromagnetic field produced by said signal as it is propagated along a helical conductor axially aligned with said electron stream. This type of amplifier is known as a "travelling-wave" tube and it is fully described on pages 108–127 of the February 1947 issue of the "Proceedings of the I. R. E." In effect, the electron stream is velocity modulated by the tangential component of the propagated radio frequency signal voltage so that some electrons are given additional velocity while others are slowed down to produce "bunches," or dense groups of electrons, which pass through the center of the helical transmission line with an average velocity slightly greater than the speed of propagation of the radio frequency signal. Since only the excess kinetic energy corresponding to this relatively small velocity difference can be converted into electromagnetic energy, the efficiency of the conventional "travelling-wave" tube amplifier is effectively restricted, ranging from about ½ to 20 per cent.

Accordingly, it is an object of the invention to provide an improved "travelling-wave" tube amplifier capable of efficiently amplifying a wide band of microwave frequencies.

It is a further object of this invention to provide a "travelling-wave" tube amplifier of the magnetron type.

It is still a further object to provide a microwave amplifier tube utilizing the magnetron type of energy conversion.

In accordance with the present invention, an improved microwave amplifier is produced by utilizing the magnetron type of energy conversion mechanism with its many obvious advantages. To use the magnetron as an amplifier, it is necessary to modify the conventional resonator circuit within the magnetron tube so that it no longer functions as an oscillator. In the conventional magnetron oscillator, regenerative feedback is inherent due to the fact that the anode segments comprising the resonator structure are arranged in a ring to effectively form a reentrant transmission line. In my invention, this inherent feedback is eliminated by employing a linear resonator, or, preferably, the resonator structure is helicoidally disposed about the axis of the tube so that there is no longer a circular anode structure, but a helical structure with discrete ends.

Another type of feedback which must be eliminated in the conventional magnetron so that amplification may be achieved is that which exists if the bunched electron stream is allowed to pass the same portion of the anode structure more than once. In this case, the signal modulation impressed upon the electron stream will induce a signal of the same frequency on the anode structure and sustained oscillations will result. Such feedback may be prevented by allowing the electron stream to traverse the anode circuit only once. In the case of the helically disposed anode structure mentioned above, this may be accomplished by tilting the magnetic field associated with the magnetron so that said field is perpendicular to the angle of pitch of the anode structure. Thus the space cloud of electrons follows the spiral of the helix and is collected at the end of its path.

For a better understanding of the present invention, together with other and further objects thereof, reference is made to the following description taken in connection with the accompanying drawings in which like reference numerals indicate similar parts:

Figure 1:
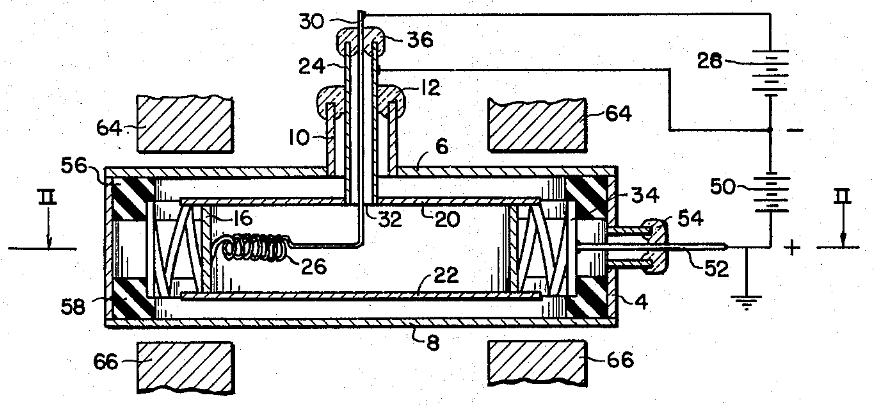
Fig. 1 is an elevational view in cross section of a magnetron device embodying the present invention.
Figure 2:
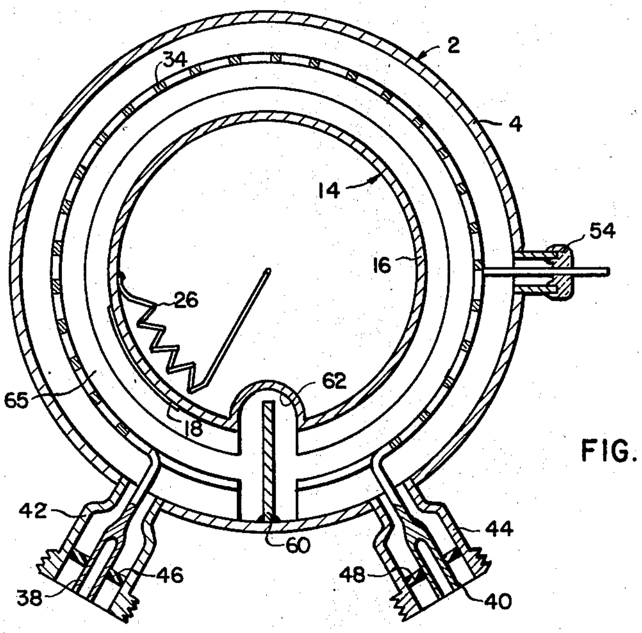
Fig. 2 is a section taken along line II—II of Fig. 1.

Referring now to Figs 1 and 2 of the accompanying drawings, I have there illustrated my invention as applied to an ultra-high frequency electric discharge device 2 of the magnetron type comprising an evacuated cylindrical envelope 4 made of copper or other electrical conductive material. Envelope 4 is closed at its ends by annular end plate 6 and disc-like bottom end plate 8 which are welded to the ends of cylinder 4 to form a hermetically sealed enclosure. Depending outwardly from the inner periphery of top end plate 6, and rigidly brazed thereto, is a tubular sleeve 10, the upper end of which is provided with glass seal 12 for sealing the discharge device after evacuation.

Centrally and axially positioned within envelope 4 there is provided a thermionic cylindrical cathode 14, preferably of the indirectly heated type, comprising an electrically conductive sleeve 16 made of nickel. A portion of said sleeve is coated externally with an electron emissive material as shown at 18. Disc-like top and bottom end shields 20 and 22, herein conveniently integral with cathode sleeve 16, are provided at opposite ends of said sleeve to prevent emitted electrons from being projected outwardly toward end plates 6 and 8. As a means for supporting the cathode structure centrally with respect to the tube, there is provided a tubular "Kovar" member 24 which is axially aligned within tubular sleeve 10. As illustrated, one end of member 24 extends through glass seal 12 and the other end of member 24 is welded to top end shield 20.

A heater 26, which is positioned within cathode 14 and which is energized by means of a heating battery 28, serves to maintain coated surface 18 at an emitting temperature. One terminal of the cathode heating element is connected to "Kovar" member 24 by being connected to cathode sleeve 16, and the other terminal is connected to lead-in conductor 30 which extends through aperture 32 of top end shield 16 and through tubular member 24. A glass seal 36 between lead-in conductor 30 and tubular member 24 maintains the structure vacuum-tight.

Figure 3:
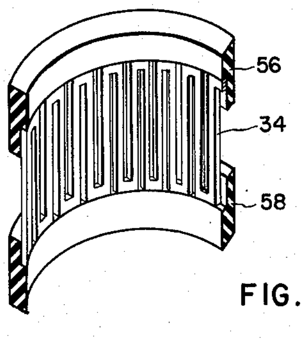
Fig. 3 is a detailed perspective view of the "serpentine" transmission line shown in Fig. 1.

Circumferentially girdling substantially all the lateral surface of cathode sleeve 16 and radially spaced therefrom is flat "serpentine" transmission line 34, the details of which are shown in Fig. 3. The surface of said transmission line facing cathode sleeve 16 is coplanar with the lateral surface of said cathode sleeve. "Serpentine" transmission line 34 surrounds all the lateral surface of cathode sleeve 16 except for the space between transmission line and terminals 38 and 40 which extend through envelope 4 to provide externally accessible signal input and output leads. Said input and output leads may be sealed by any suitable sealing structure such as metallic cylinders 42 and 44 terminated by glass beads 46 and 48. Transmission line 34 is maintained at a positive potential with respect to cathode 14 by means of an appropriate voltage source 50 which is applied to the transmission line 34 by lead-in conductor 52 through lead-in glass seal 54.

Within tube 2, and in abutment with a portion of the inner surface of envelope 4, there is provided a pair of opposing top and bottom tubular spacer rings 56 and 58 consisting of a dielectric material such as lava, steatite, or the like. As shown, the inner peripheries of said rings are coextensive with the facing surfaces of transmission line 34 and the opposing surfaces of said spacer rings are recessed in such a manner as to support transmission line 34 in position with respect to cathode 14.

While in the particular embodiment illustrated there has been described a "serpentine" transmission line, it will be understood that other transmission lines such as a helically wound conductor or interdigital type may be used.

To provide an electromagnetic screen between transmission line end terminals 38 and 40, radially disposed collector plate 60 is positioned midway between said end terminals in a plane transverse to the lateral wall of envelope 4. One end of said collector plate is coextensive with the inner surface of envelope 4 and extends radially inward therefrom to slightly beyond the periphery of cathode sleeve 16. End shields 20 and 22 and cathode sleeve 16 are provided with axially aligned peripheral clefts 62, thus providing a means for insulating the cathode structure from collector plate 60. By this arrangement, electrons emitted circumferentially about the cathode are prevented from travelling more than once around the circumference of transmission line 34. Thus, oscillations are suppressed by eliminating the feedback that exists unavoidably in the conventional magnetron oscillator.

It should be understood that the output connected to output terminal lead 40 is of such impedance value as to absorb the energy induced in transmission line 34, thus preventing reflection at the utilization end of said transmission line and prevent the occurrence of standing waves thereon.

A uniform magnetic field having flux lines extending parallel to the axis of the tube and the emitting surface is provided by top and bottom cylindrical pole faces 64 and 66 which may be energized by any of the means well known in the art (not shown). Preferably, the flux lines should be concentrated in the interaction space 65 between cathode 14 and transmission line 34.

The operational principle of the device shown in Figs. 1 and 2 is based on the energy exchange between the rotating electron space charge and the transverse and longitudinal electric vectors of the radio-frequency signal, or travelling wave, propagated along transmission line 34 which, for the purposes of this discussion will hereinafter be referred to as the anode. Due to the nature of the transmission line employed, the phase velocity of the travelling wave is retarded so that it is approximately $\frac{1}{10}$ the velocity of light. Of course, it is to be understood that this velocity is determined by the propagation characteristics of the type of transmission line employed. By means of the D. C. voltage applied to the anode, a radial electric field is created in the interaction space 65 between cathode 14 and surrounding anode structure 34. This electric field, in connection with the uniform magnetic field produced by pole faces 64 and 66, serves to create within the confines of the interaction space a rotating electron space charge which is maintained by means of electrons emitted from cathode 14. The rotational velocity of the electron space charge may be adjusted to equal the velocity of the propagated travelling wave by selecting appropriate values of D. C. voltage and magnetic field strength.

It is well known that, in the absence of any radio frequency field, an electron emitted from cathode 14 describes an epicycloidal orbit and returns to said cathode with zero kinetic energy. If a radio frequency field is present, which in this case is supplied by the travelling wave as it is propagated along transmission line 34, and an electron is emitted at such time as to be accelerated by said field, it absorbs energy but is eliminated from the interaction space because it is absorbed and dissipated on cathode 14. On the other hand, if an electron is emitted at a time such that its first orbit passes through an opposing, or retarding, radio frequency field, that electron delivers part of its kinetic energy to said radio frequency field and the orbit is shortened so that it does not return to the cathode. It is then re-accelerated toward the anode and again opposes the radio frequency field (which has moved along since the first interaction above) so that still more energy is imparted to the anode. In other words, a retarding field brings the electron closer to the anode; an acelerating field brings it closer to the cathode. In this manner the "in-phase" electrons remain in the interaction space for a large period of time so that they can interact most favorably with the tangential components of the radio frequency field before coming to rest on the anode. Because the electrons approach the anode without variation in their speed, the energy imparted to the transmission line anode amplifies the radio frequency signal as it is propagated along the transmission line. Since the electrons which have given up energy to the anode will regain it constantly from the D. C. field, a much greater efficiency can be obtained than that achieved in the conventional "travelling-wave" tube amplifier.

Figure 5:
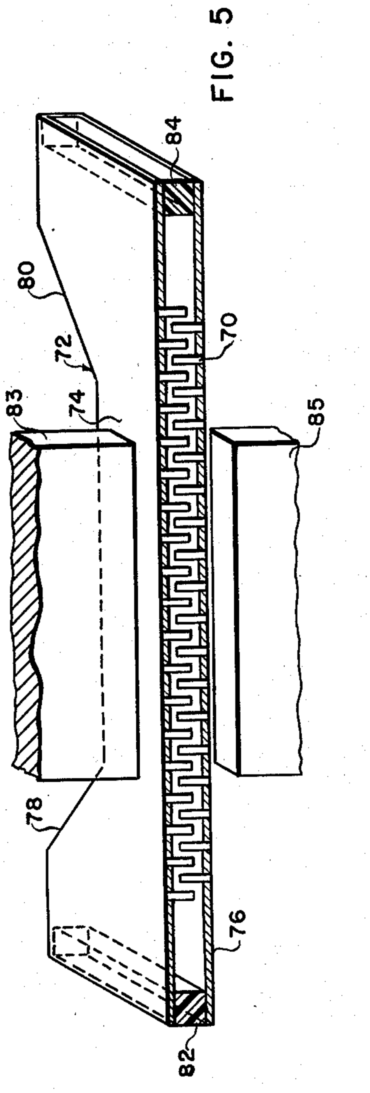
Fig. 5 is a detailed perspective view taken along line IV—IV of Fig. 4.
Figure 4:
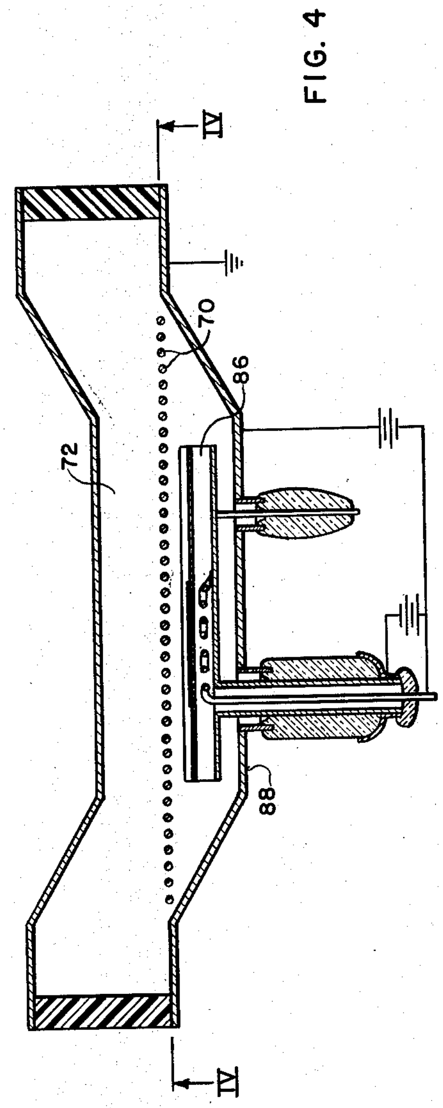
Fig. 4 is a top view in cross section of another embodiment of my invention.

Instead of the cylindrical structure shown in Figs. 1 and 2, a linear magnetron type structure may be employed. Such a device is illustrated in Figs. 4 and 5. As shown, an interdigital transmission line 70 is linearly disposed in a vertical plane within evacuated waveguide 72 between top and bottom walls 74 and 76. Flared ends 78 and 80 are provided to properly match the impedances of rectangular waveguide input and output sections 82 and 84 respectively, said input and output sections corresponding to end terminals 38 and 40 of Fig. 1. Linear cathode 86 is coated with an emissive material and is centrally positioned within waveguide 70 between end waveguide wall 88 and interdigital transmission line 70. A magnetic field having flux lines extending between top and bottom waveguide walls 74 and 76 and concentrated in the interaction space between cathode 86 and interdigital transmission line 70 is provided in the conventional manner by pole pieces 83 and 85. The means for energizing said pole pieces are not shown since they are well known in the art. Other details of the device shown in Fig. 4 may be similar to those described in connection with Fig. 1.

Figure 6:
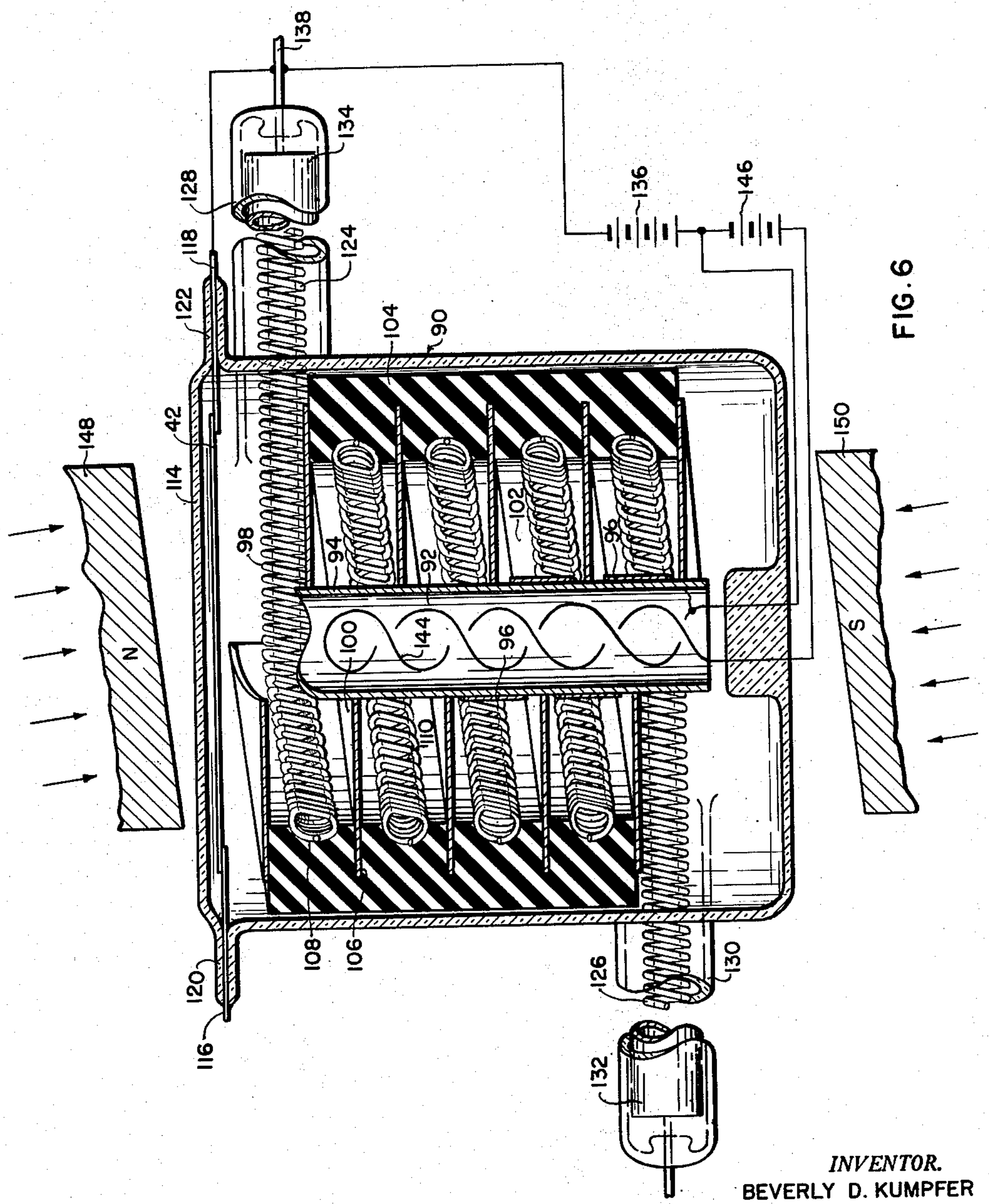
Fig. 6 is an elevational view, partly in section, of a preferred embodiment of my invention.
Figure 7:
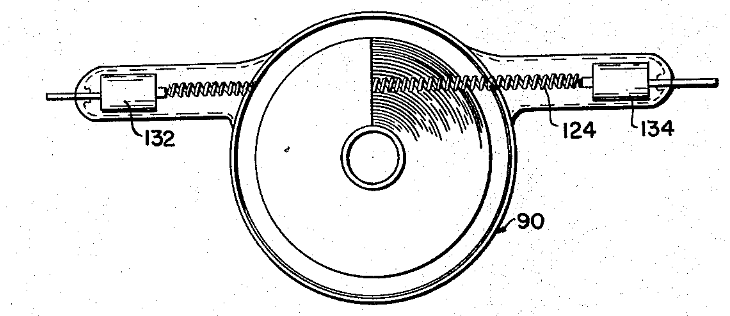
Fig. 7 is a top view of the structure illustrated in Fig. 6.

Figs. 6 and 7 illustrates a preferred embodiment of the invention and differs from Fig. 1 essentially in that a spiralled, or helically disposed, transmission line is substituted for the single-turn "serpentine" transmission line shown in Figs. 1 and 2. By this arrangement, it is possible to achieve greater amplification than with a single-turn transmission line as will hereinafter be explained.

Referring now to Figs. 6 and 7, there is shown a magnetron type electric discharge device comprising evacuated envelope or tube 90 having a cathode 92 extending axially thereof. Cathode 92 may be of any suitable type adapted to be heated and it consists of an electrically conductive sleeve 94, a portion of which is coated externally with an electron emitting material as shown at 96.

Helicoidally surrounding cathode sleeve 94 for the entire length thereof, and coaxial therewith, is transmission line 98, herein shown as a helically wound conductor. The turns of helicoidally disposed transmission line 98 are uncoupled relative to each other by means of a helical blade-like band 100, herein conveniently integral with cathode sleeve 94. Helical band 100 might be considered to define the walls of an elongated trough which has been twisted in the form of a helix, thus generating a helicoidal channel 102 along which transmission line 98 is disposed. Like the "serpentine" transmission line of Fig. 1, that portion of transmission line 98 facing cathode sleeve 94 is flattened as at 110 to provide transmission line surfaces that are parallel to the lateral surface of sleeve 94.

To rigidly support helical band 100 and cathode sleeve 94 in position within tube 90, there is provided a tubular structure 104 made of steatite, lava, or any other suitable dielectric material. Said tubular structure is centrally positioned within tube 90 so that it axially girdles cathode sleeve 94 for the entire length thereof. The inner surface of tubular structure 104 is provided with a pair of parallel helical slots 106 and 108 having a uniform pitch. Narrow slot 106 is shaped to accept and support the periphery of blade-like band 100, while shallow slot 108 is shaped to support transmission line 98 in position with respect to cathode 92. With helical band 100 screwed into narrow slot 106, helicoidal channel 102 is enclosed by the inner surface of said tubular structure. As illustrated, transmission line 98 is disposed within slot 108 to conform with the helicoidal pattern provided therefor. The diameter of helicoidal transmission line 98 is a function of the cathode diameter and is such that:

$$\frac{\text{diameter of transmission line}}{\text{diameter of cathode}}=\frac{N+4}{N-4}$$

where N is the number of half-wave lengths per circumference of transmission line.

Disc-like anode collector plate 112 is positioned in a plane transverse to the axis of cathode 92 between topmost wall 114 of tube 90 and said cathode. The diameter of collector plate 112 is made at least equal to the inner diameter of tubular structure 104 and it is supported within the tube by metal rods 116 and 118 which are brought out through the lateral wall of tube 90 by glass seals 120 and 122. Ends 124 and 126 of transmission line 98 are brought out through the lateral wall of tube 90 by lead-in glass seals 128 and 130, respectively, and are terminated by short metal collars 132 and 134. As shown, end 124 is brought out near the top of tube 90 and end 126 is brought out near the bottom of said tube, thus providing externally accessible signal input and output leads for broad band coupling. Collector plate 112 and transmission line 98 are maintained at a positive D. C. potential with respect to cathode 92 by means of battery 136, or other suitable means. This potential is applied to transmission line 98 and collector plate 112 through end lead-in conductor 138 and supporting rod 118, respectively. Thus transmission line 98 and anode collector plate 112 are at the same potential with respect to cathode 92. A heater 144, which is positioned within the cathode and which is energized by means of heating battery 146, serves to maintain coated surface 96 at an emitting temperature. As illustrated, one end of the filament is conventionally connected to cathode sleeve 94.

A magnetic field (indicated by the arrows) perpendicular to the pitch of helicoidally disposed transmission line 98 is established by pole 148, which provides a cylindrical pole face over the top end of tube 90 forming a north pole as indicated by the letter N, in conjunction with the pole 150 having a similar cylindrical pole face labeled S, providing the south pole at the bottom end of the tube.

Figure 8:
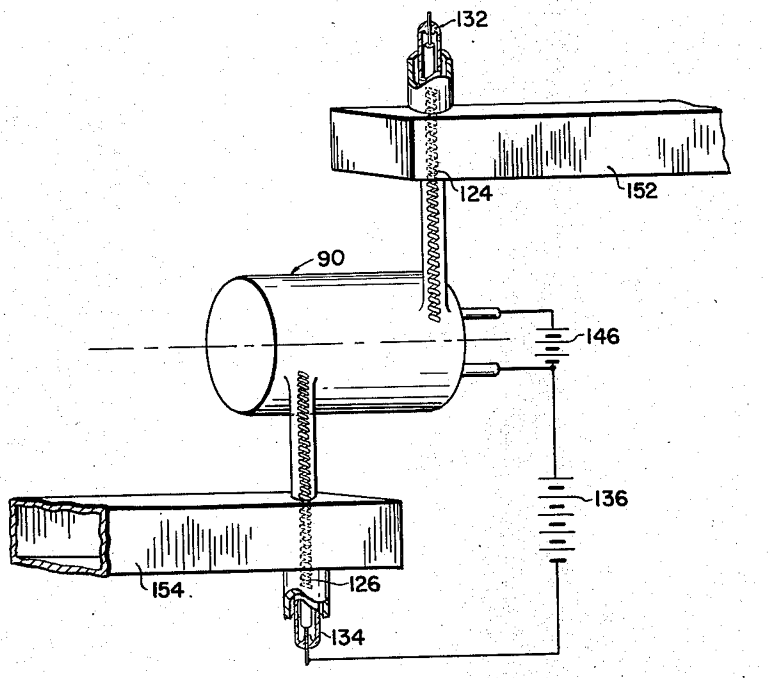
Fig. 8 illustrates a means for coupling a radio frequency signal to a magnetron device embodying my invention.

One method for applying a radio-frequency signal that is to be amplified to conductor 98 is illustrated in Fig. 8. End 124 of conductor 98 is oriented within input signal wave guide 152, thus coupling the radio frequency signal to conductor 98. Metal collar 132 and the inner surface of input wave guide 152 form the plates of a capacitor which acts as a short for the input radio frequency signal, thereby assuring continuity along the inner surface of said input wave guide, but acts as a blocking condenser for the direct current voltage applied from voltage source 136 to conductor 98 and collector plate 112. End 126 of conductor 98 is oriented within output wave guide 154 so that the amplified output signal is coupled thereto. Metal collar 134 is similar to metal collar 132 and serves the same function.

As will be readily understood by those versed in the art, the electron cloud, which can be considered as rotating steadily in the interaction space of a magnetron of conventional design, is given an axial component of velocity by slightly tilting the axis of the tube with respect to the magnetic field, or by the addition of charged end plates, or as in this case, by a combination of both. This will cause the electrons to spiral axially through the tube while performing their function of energy conversion as explained in connection with Fig. 1. By selecting appropriate values of D. C. voltage and magnetic field strength, the axial velocity of the electron cloud may be adjusted to equal the axial velocity of the propagated signal. Thus, if a transmission line such as conductor 98 is disposed helicoidally about the axis of the tube with a pitch similar to the spiral described by the electrons, and the space cloud in general, and said transmission line is terminated in its characteristic impedance so that standing waves do not exist, no feedback medium exists, hence no oscillations can occur and amplification of the signal propagated along transmission line 98 is achieved by the interaction of the spiralling space cloud and the electromagnetic field established by the propagated signal.

Figures 9, 10:
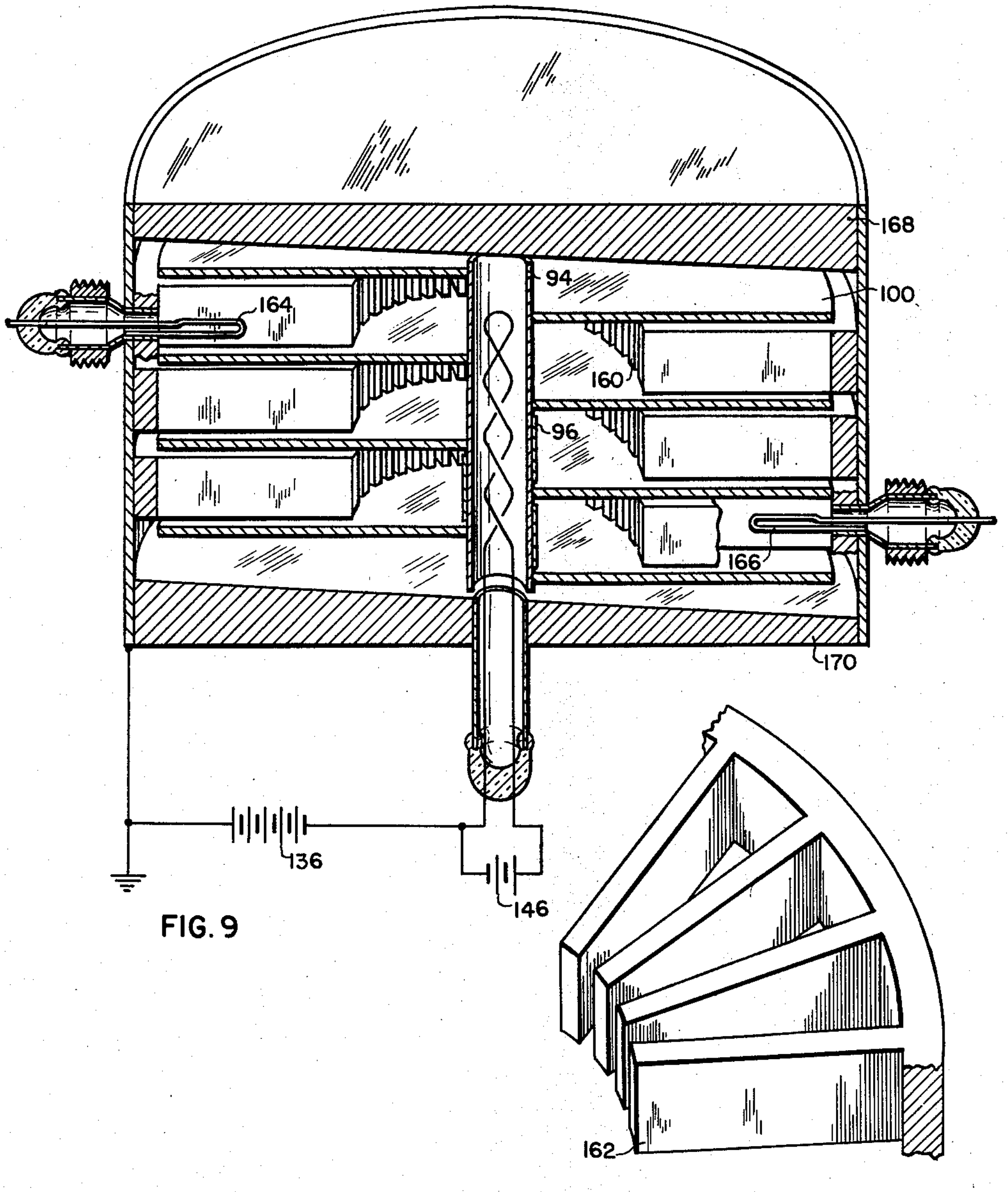
Fig. 9 is an elevational view, partly in section, of a magnetron amplifier employing a vane-type transmission line.
Fig. 10 illustrates in detail the vane-type structure shown in Fig. 9.

Fig. 9 illustrates another modification of the invention and differs from Fig. 6 essentially in the substitution of the wire type of transmission line by means of a radially disposed vane-type transmission line 160, the details of which are shown in Fig. 10. Radial vanes 162 are helicoidally disposed about cathode 92 and coaxial therewith, the innermost ends of said vanes being coplanar with the lateral surface of said cathode. The metal collars shown in Fig. 6 have been replaced by conventional coupling loops 164 and 166 to provide broad band coupling. Other suitable means for providing a broad band coupling into and out of the transmission system such as a wave guide may also be used. The innermost ends of radial vanes 162 are parallel to the axis of cathode sleeve 94 and serve as anode faces. Magnetic pole pieces 168 and 170 are provided to establish a magnetic field perpendicular to the pitch of helicoidally disposed vane-type transmission line 160. In this arrangement, the turns of the vane-type transmission line are uncoupled relative to each other by means of helical blade-like band 100 integral with cathode sleeve 94. Other details of the device shown in Fig. 9 may be similar to those described in connection with Fig. 6.

Figure 11:
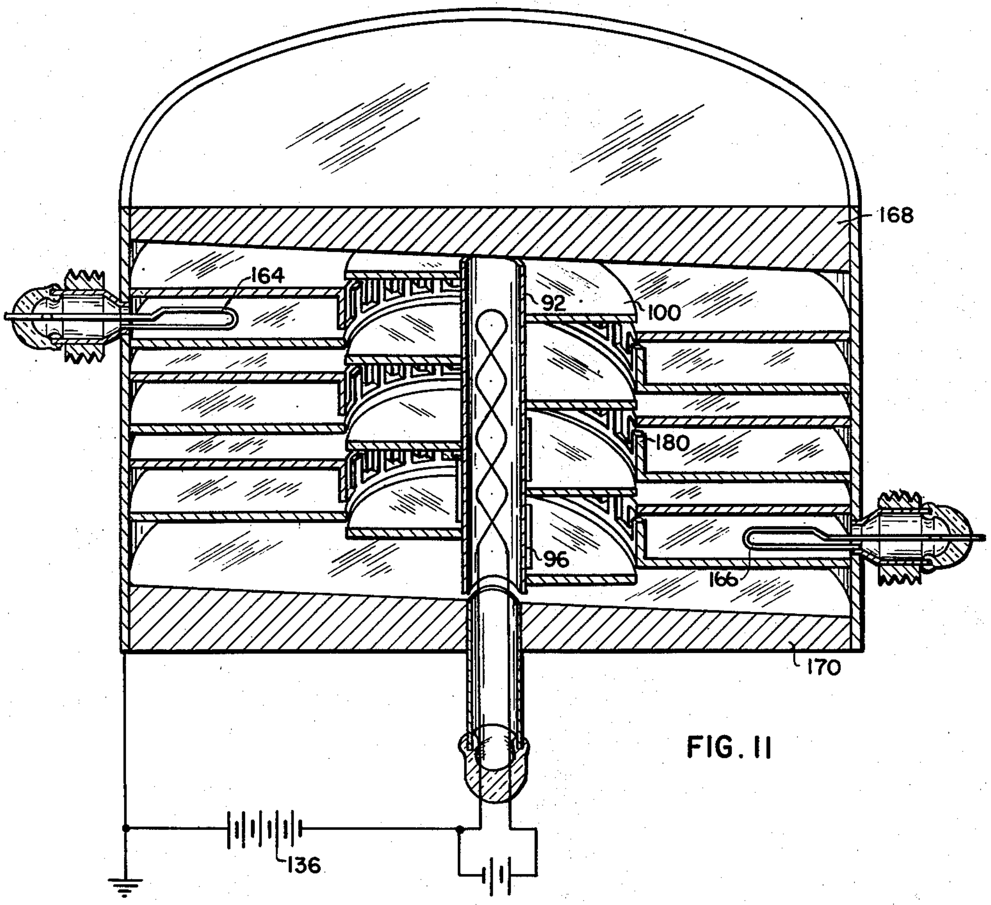
Fig. 11 is an elevational view, partly in section, of a magnetron amplifier employing an interdigital transmission line.
Figure 12:
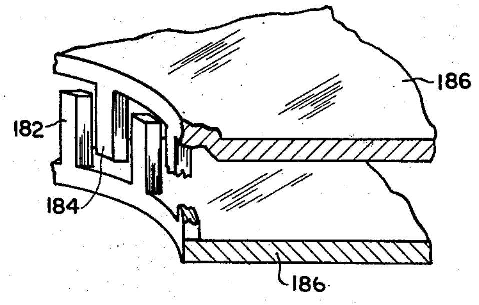
Fig. 12 illustrates in detail the interdigital transmission line structure shown in Fig. 11.

In Fig. 11 there is illustrated a modification of my invention wherein an interdigital type of transmission line is employed, the details of which are shown in Fig. 12. In this arrangement, transmission line 180 is formed by two sets of interlaced teeth 182 and 184 which are positioned in a plane parallel to the axis of cathode 92. Interlaced teeth 182 and 184 are spaced substantially an electrical quarter-wavelength from the walls of the tube by metal annular discs 186 which are maintained at a D. C. positive potential with respect to the cathode by means of battery 136, or other suitable means. The magnetic field associated with the magnetron, provided by pole pieces 168 and 170, is tilted so that the field is perpendicular to the pitch of the helicoidally disposed interdigital teeth. The individual turns of the helix formed by the interdigital transmission line are uncoupled relative to each other by helical blade-like band 100 the outer diameter thereof being at least equal to the diameter of the helix. Coupling loops 164 and 166 are inserted at the extremities of the helix to provide broad band coupling.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electron discharge device for amplification of ultra-high radio-frequency energy comprising an envelope, an elongated electron emitting cathode axially positioned within said envelope, an anode including a transmission line helicoidally girdling and radially spaced from said cathode for the entire length thereof, successive turns of said transmission line being spaced from each other, means coupled at one end of said transmission line for applying a radio-frequency signal thereto whereby said signal is propagated along said transmission line at a prescribed axial velocity, a longitudinal magnetic field producing means tilted with respect to the axis of and adjacent said cathode to cause said emitted electrons to follow a helicoidal path about said cathode with a pitch substantially equal to the pitch of the helicoidally disposed transmission line, and a flat helical band disposed about said cathode and having a pitch equal to the pitch of the helicoidally disposed transmission line, the turns of said band interleaving with the turns of the said transmission line.

2. An ultra-high frequency electric discharge device of the magnetron type comprising an envelope, a tubular cathode axially positioned within said envelope and coated with an electron emissive material, a transmission line helicoidally girdling and radially spaced from said cathode for the entire length thereof and having successive turns spaced from each other, means coupled to one end of said transmission line for applying a radio frequency signal to said transmission line whereby said signal is propagated along said transmission line with a prescribed axial velocity, a collector anode adjacent one end of said cathode in a plane transverse to the axis of said cathode, means for establishing a longitudinal magnetic field angularly displaced with respect to the axis of said cathode in the interaction space between said cathode and said transmission line whereby electrons are propelled in a helical path about said cathode with a pitch substantially equal to the pitch of said transmission line, and a flat helical band disposed about said cathode, the turns of said band interleaving with the turns of said transmission line.

3. An ultra-high frequency electric discharge device of the magnetron type comprising an envelope, a tubular cathode coated with an electron emissive material, said cathode being centrally positioned within said envelope and coaxial therewith, a transmission line helicoidally girdling and radially spaced from said cathode for the entire length thereof and having successive turns spaced from each other, a flat helical band integral with said cathode, the turns of said band interleaving with the turns of the helicoidally disposed transmission line, means surrounding said cathode for supporting said transmission line in position with respect to said cathode, means for establishing a longitudinal magnetic field angularly displaced with respect to the axis of said cathode in the interaction space between said cathode and said transmission line whereby electrons are propelled in a helical path about said cathode with a pitch substantially equal to the pitch of said transmission line, means for coupling an external radio-frequency signal to one end of said transmission line whereby said signal is propagated along said transmission line with a prescribed axial velocity, and means for extracting said signal.

4. The device set forth in claim 3 wherein said transmission line comprises a plurality of radial vanes extending inwardly from the lateral surface of said envelope.

5. The device set forth in claim 3 wherein said transmission line comprises two sets of interlaced teeth positioned in a plane parallel to the axis of said cathode, and means for supporting said teeth in position with said cathode.

6. The device in accordance with claim 3 and further including a collector anode adjacent one end of said cathode in a plane transverse to the axis thereof.

References Cited in the file of this patent

UNITED STATES PATENTS

| | | |
|---|---|---|
| 2,122,538 | Potter | July 5, 1938 |
| 2,241,976 | Blewett et al. | May 13, 1941 |
| 2,359,302 | Curtis | Oct. 3, 1944 |
| 2,511,407 | Kleen et al. | June 13, 1950 |
| 2,531,972 | Doehler et al. | Nov. 28, 1950 |
| 2,541,843 | Tiley | Feb. 13, 1951 |
| 2,566,087 | Lerbs | Aug. 28, 1951 |
| 2,640,951 | Kuper | June 2, 1953 |
| 2,651,686 | Clavier et al. | Sept. 8, 1953 |
| 2,672,572 | Tiley | Mar. 16, 1954 |